(12) United States Patent
Schaeck et al.

(10) Patent No.: US 6,829,597 B1
(45) Date of Patent: Dec. 7, 2004

(54) METHOD, APPARATUS AND COMPUTER PROGRAM PRODUCT FOR PROCESSING CASHLESS PAYMENTS

(75) Inventors: Thomas Schaeck, Boeblingen (DE); Roland Weber, Karlsruhe (DE); Horst Henn, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/638,745

(22) Filed: Aug. 14, 2000

(30) Foreign Application Priority Data

Aug. 14, 1999 (DE) ........................................ 199 37 695

(51) Int. Cl.[7] .............................................. G06F 17/60
(52) U.S. Cl. ............................ 705/67; 705/39; 705/26; 705/76; 705/75; 705/64; 705/65; 380/30
(58) Field of Search ........................ 380/30; 705/64–79, 705/39, 26

(56) References Cited

U.S. PATENT DOCUMENTS

| | | | | |
|---|---|---|---|---|
| 5,915,022 A | * | 6/1999 | Robinson et al. | 380/24 |
| 6,098,053 A | * | 8/2000 | Slater | 705/44 |
| 2002/0073043 A1 | * | 6/2002 | Herman et al. | 705/64 |
| 2002/0077889 A1 | * | 6/2002 | Kolls | 705/14 |

FOREIGN PATENT DOCUMENTS

| | | | | |
|---|---|---|---|---|
| JP | 09-116960 | * | 2/1997 | H04Q/7/38 |

OTHER PUBLICATIONS

Deng et al., "A New On-Line Cash Check Scheme", 1997, ACM, pp. 111–116.*

* cited by examiner

Primary Examiner—James P. Trammell
Assistant Examiner—Jalatee Worjloh
(74) Attorney, Agent, or Firm—Karl O. Hesse; Norman L. Gundel

(57) ABSTRACT

A computer program product and programmed method for performing cashless payments between a customer and a dealer via a bank. The invention is embodied in an on-line computerized process between customer and dealer to define the payment method, check the availability frame, issue a voucher to describe the transaction, issue a payment instruction, signature of the issued voucher by the dealer and signature of the payment instruction by the dealer and the customer. In another embodiment, the information is gathered and the voucher and payment instructions are generated off-line. A subsequent on-line process between the dealer and bank transfer the signed payment instruction and signed voucher to the bank where computer coded checks the dealer and customer signature, checks the allocation between payment instruction and voucher, replaces the dealer and customer identity data with information for performance of the payment instruction, and performs the payment instruction and stores the voucher. An advantage of the process is that no sensitive customer data such as account number, credit card number etc. is stored on the customer card and hence misuse by unauthorized persons is minimized. In addition the process serves to define the payment methods required by the customer for mechanical processing and to minimize the risk to the customer upon loss of the customer card. The process also allows customers who do not have a bank account, such as children for example, to have access to an electronic payment means with limited availability frame. The customer card can be either a card with contacts or a contactless card.

2 Claims, 5 Drawing Sheets

| Structure of Payment Instruction |
|---|
| Customer or customer card ID |
| Dealer or dealer card ID |
| Payment amount (optionally with currency) |
| Payment method (e.g. credit note, debit note, credit etc.) |
| Customer availability frame (credit line) |
| Voucher fingerprint |
| Serial number of dealer card |
| *Optional:* |
| Serial number of customer card |
| Date of payment instruction |
| Proposed application (read from customer chipcard) |
| ...... |
| *Subsequently added* |
| Dealer signature |
| Customer signature |

FIG. 3

| Structure of Payment Instruction |
|---|
| Customer or customer card ID |
| Dealer or dealer card ID |
| Payment amount (optionally with currency) |
| Payment method (e.g. credit note, debit note, credit etc.) |
| Customer availability frame (credit line) |
| Voucher fingerprint |
| Serial number of dealer card |
| *Optional:* |
| Serial number of customer card |
| Date of payment instruction |
| Proposed application (read from customer chipcard) |
| ...... |
| *Subsequently added* |
| Dealer signature |
| Customer signature |

FIG. 4

| Structure of Voucher |
|---|
| Identification of dealer (e.g. name and address) |
| Freely definable zone<br><br>Preferably with list of individual items, data on individual amounts and VAT shown |
| Payment amount (optionally with currency) |
| *Optional:* |
| Customer identification (card or customer number) |
| Proposed application (read from customer chipcard) |
| ...... |
| *Subsequently added* |
| Dealer signature |

FIG. 6

| Content of Customer Chipcard |
|---|
| Customer or card ID |
| Secret key for signature (known only to bank) |
| PIN or password (known only to customer) |
| Payment methods which the bank offers the customer (e.g. credit note, debit note/credit card) in order of priority |
| Availability frame of customer (credit line) |
| *Optional* |
| Secret key for access to card data (known only to bank, available on dealer chipcard) |
| Serial number for payment instructions |
| Proposed application (for insertion in voucher or payment instruction) |
| Log of last n signed payment instructions |
| ...... |

FIG. 7

| Content of Dealer Chipcard |
|---|
| Dealer or card ID |
| Secret key for signature (known only to bank) |
| Payment methods agreed between bank and dealer |
| Serial number for payment instructions |
| *Optional* |
| Secret key for access to card data (direct or as master keys for deriving CKK key) |
| Private key for signing vouchers (known only to dealer, corresponding public key deposited at bank) |
| Running total of signed payment instructions |
| Log of last n signed payment instructions |
| ...... |

METHOD, APPARATUS AND COMPUTER PROGRAM PRODUCT FOR PROCESSING CASHLESS PAYMENTS

BACKGROUND OF THE INVENTION

1. Field of the Invention

The present invention describes a computer program process and apparatus for electronic processing of cashless payments between customers and dealers, merchants and the like by means of portable security medium, in particular chipcards.

2. Description of Related Art

Cashless payment by chipcards have become common in many areas of daily life. Here a distinction is made between account-related and non-account-related cashless payments with chipcards. An account-related chipcard requires an account with the bank issuing the card. If the customer wishes to process a cashless payment with his chipcard, he usually inserts the chipcard in the dealer's card reader machine, a data link is created to the customer's bank, the bank checks the presence of a covered account by the chipcard holder and if the account contains adequate cover, authorises payment to the dealer. The disadvantage of this account-related chipcard lies in the fact that the creation of an on-line connection to the customer's bank can take a very long time or because of overload on the bank system, no connection can be established at all. In this case the customer must pay with cash or other payment means. If the customer has another account-related chipcard from another card-issuing bank, he can repeat the same process with this chipcard.

A non-account related chipcard alternative to the account-related chipcard is the so-called money card. The money card contains a specific money amount in the form of bytes which are transferred to the dealer system when payment is made. The advantage of this money card is that the customer can pay the dealer direct without on-line connection to his bank. A disadvantage of the money card is however its currently low acceptance by customers and the resulting lack of infrastructure.

SUMMARY OF THE INVENTION

It is therefore an objective of the present invention to provide a process and a device for cashless payment transactions which combines the advantages of the account-related and non-account-related chipcard but without their disadvantages.

An advantage of the present invention is that the customer can perform several payment methods with individual payment features using his customer card. From the bank he receives a standard contract for all payment methods and a consolidated report on payments made and electronic vouchers which can be subsequently processed within an electronic business application. The customer can if he wishes pay the dealer totally anonymously because only the bank can correlate the customer card number to a customer.

With a dealer terminal and a standard dealer application, a dealer can perform all common payment methods and the bank is the sole partner for all contract conditions, definition of terminal hardware, queries etc.

Complex processes such as querying the required payment method, customer address, proposed application etc. on payment are not required. The dealer has access to the electronic vouchers in the case of customer complaint.

The bank can offer both dealers and customers a comprehensive standardised system and the bank can operate profitably with attractive fee rates.

BRIEF DESCRIPTION OF THE DRAWINGS

FIG. 3 shows the structure and content of the payment instruction of FIGS. 8 and 9.

FIG. 4 shows the structure and content of the voucher in FIGS. 8 and 9.

FIG. 6 shows the content of the customer card for performance of the process according to FIGS. 8 and 9.

FIG. 7 shows the content of the dealer card for performance of the process according to FIGS. 8 and 9.

DETAILED DESCRIPTION OF THE INVENTION

Figure 1:
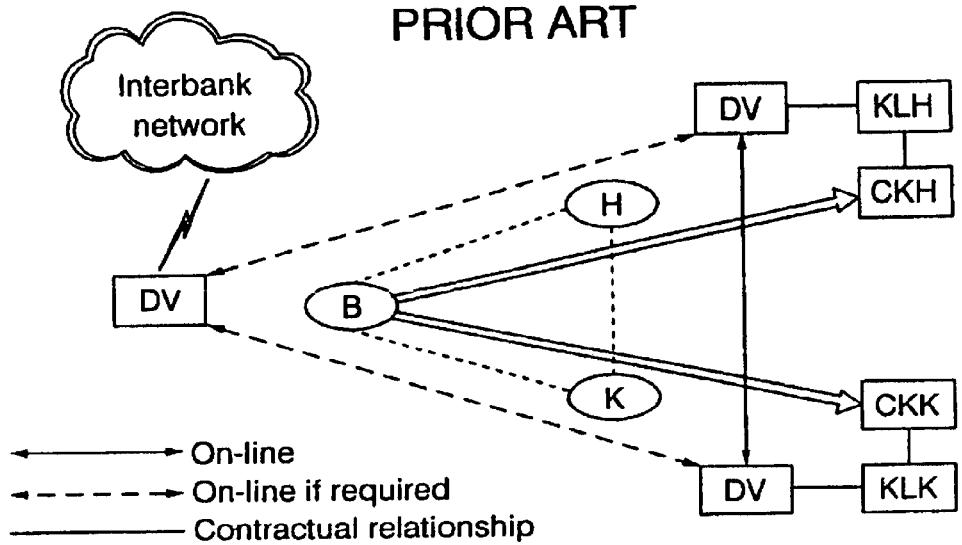
FIG. 1 shows a prior art on-line payment architecture for cashless payments.

FIG. 1 shows a known on-line architecture for cashless payment between a customer and a dealer and a dealer and a bank. The architecture consists of a bank terminal (B), a dealer terminal (H) and a customer terminal (K). Communication between the customer and dealer terminals takes place via an on-line data connection. The same applies to communication between the dealer and bank terminals. The dealer terminal consists of a data processing machine (DV) with a connected card reader (KLH) and a security module in the form of a chipcard (CKH). The dealer's data processing machine runs a payment application program (ZAP). The customer terminal (K) also consists of a data processing machine (DV), a card reader (KLK) and a security module in the form of a chipcard (CKK). The customer terminal also runs a payment application program (ZAP) or the customer loads certain applets for processing of a payment on his terminal. This is done preferably via the dealer system.

Figure 2:
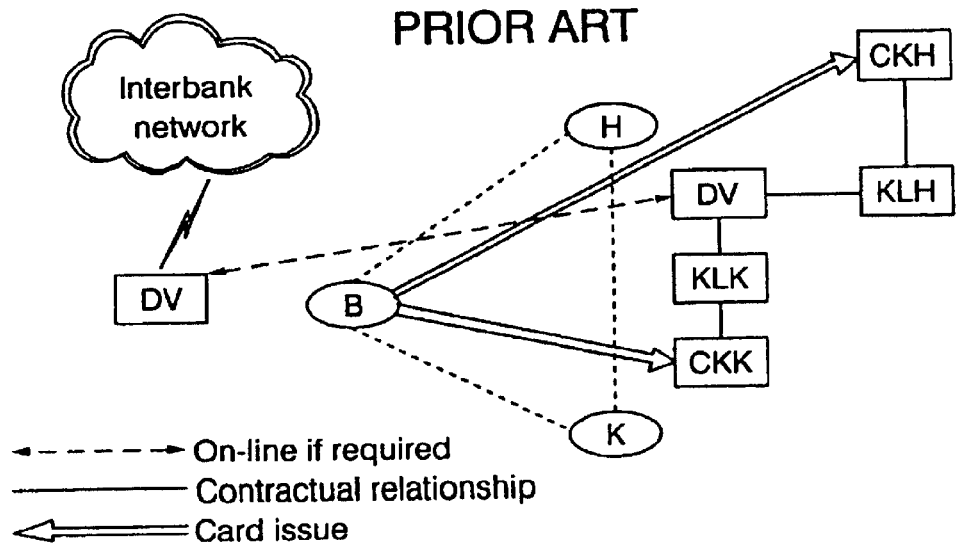
FIG. 2 shows a prior art off-line payment architecture for cashless payments.

FIG. 2 shows a known off-line architecture for cashless payment between a customer (K) and a dealer (H), where communication between the dealer (H) and bank (B) takes place on-line if required. In contrast to FIG. 1, in the architecture of FIG. 2, there is no customer terminal (K). The dealer terminal (H) therefore consists of a data processing machine (DV), a dealer card reader (KLH) for the dealer chipcard and a customer card reader for the customer chipcard (CKK).

Figure 8:
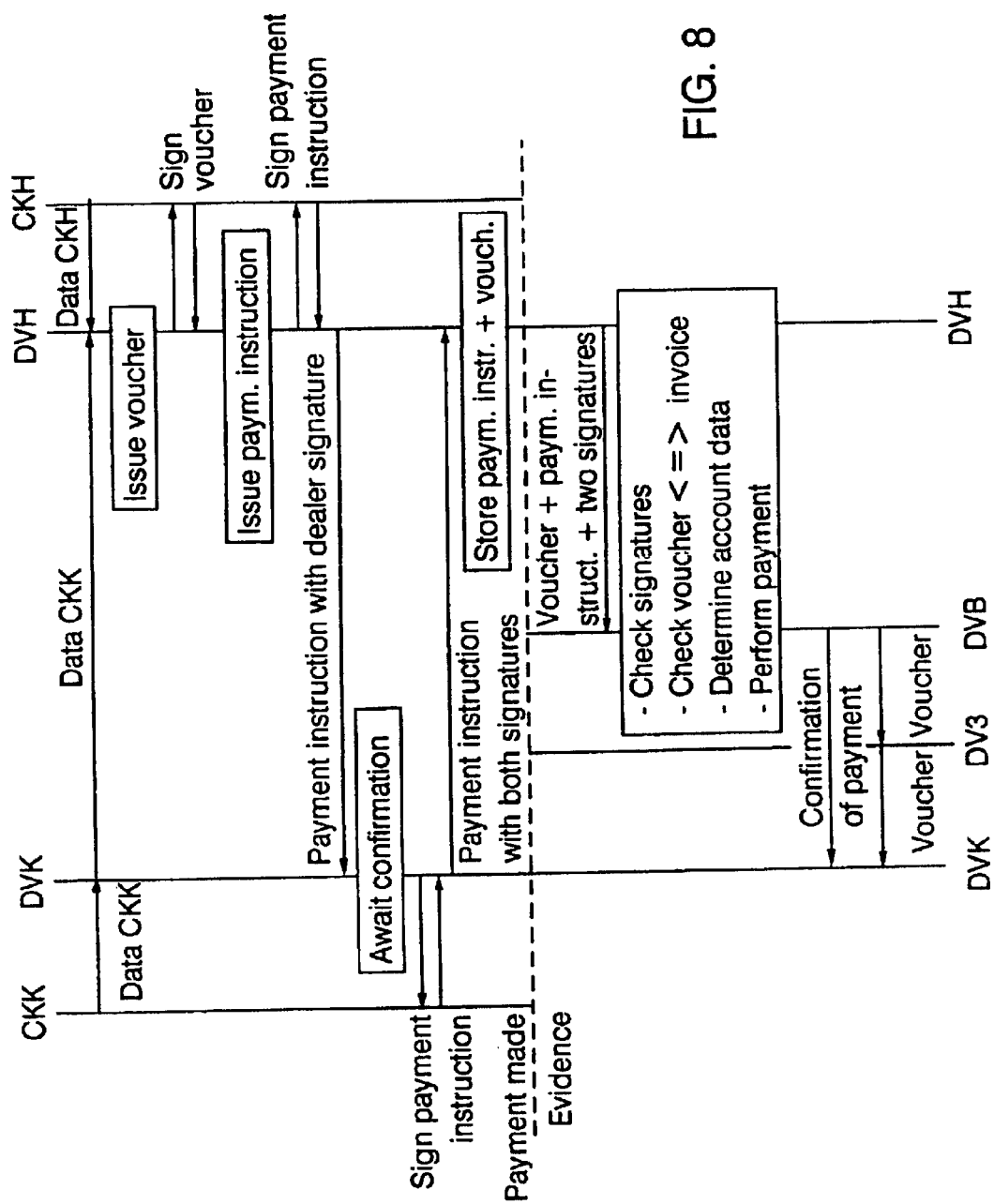
FIG. 8 shows the computer program process according to the invention for cashless payment.

FIG. 8 shows a preferred embodiment of the computer program product process according to the invention using the individual process steps for cashless payment via an on-line connection between customer and dealer. The customer has a customer terminal as described in FIG. 1.

He inserts a portable secure medium in the form of a customer chipcard (CKK) in the card reader (KLK) and creates a connection using a browser to the dealer terminal (DVH). There the customer selects for example an on-line shopping application, selects products and gives a delivery address. This on-line transaction is usually terminated by entering a payment method and confirmation of purchase.

In the application of the computer process according to the invention, the customer uses the chipcard to pay for items in a transaction. Cashless payment using the customer card takes place in the following computer programmed steps:

1. Receive the customer card (CKK) in the customer card reader if the the card has not previously been inserted into the card reader. The customer card communicates via an applet with the dealer payment application on the dealer's server. The applet generates chipcard commands in the form of APDUs, and sends these APDUs to the customer card (CKK) for analysis. The analysed results are sent by the applet to the dealer payment application. The customer card (CKK) must be prepared for the process according to the invention by storing in the non-volatile memory of the customer card (CKK) at least the following data:
   a) Identification data on the customer or customer chipcard (CKK)
   b) Secret code which the bank has applied to the chipcard
   c) Credit line or availability frame which the bank grants the customer
   d) Payment method which the bank accepts for this customer
   e) PIN—Personal Identification Number—or password. The information in e) is required only if the customer pays on-line.
2. Read data a), c) and d) from the customer card using chipcard commands. These data are transferred by the applet using HTTP protocol to the dealer payment application and deposited in the volatile memory of the dealer terminal (DVH).
3. The dealer payment application reads the following data from the dealer card (CKH) or the stationary security module and stores this in the volatile memory of the dealer system:
   a) Identification data on the dealer or dealer card (CKH) or security module of the dealer.
   b) Payment methods which the dealer accepts according to the bank agreement.
4. The dealer payment application, using the data read from both cards, determines possible payment methods. For several payment possibilities the customer makes a selection using the applet which shows the selection via a graphical user interface (GUI). If the customer makes no selection, the payment method is selected from a priority sequence. The dealer payment application also checks whether the availability frame is exceeded by the payment amount. If the availability frame is exceeded, an on-line connection is automatically created to the bank. If there is adequate cover, the bank establishes the availability frame at a new amount and sends the new availability frame to the customer card (CKK) where the old availability frame is replaced by the new availability frame. If the bank does not establish a new availability frame, confirmation by the dealer is required as to whether the payment process will be interrupted or continued at the risk of the dealer.
5. Computer programmed code in the dealer payment application produce a voucher which contains information on the transaction performed in a form accessible to visual representation. On a purchase, the voucher contains preferably the following data:
   a) Names or item numbers of products sold
   b) Unit price of products
   c) Quantity of products
   d) Total price
   e) Tax such as value added or sales tax
   f) Delivery charges.
6. Computer instructions calculate a voucher fingerprint by application of a hash function to the voucher.
7. Further computer code generates a signature of the fingerprint using a private key stored in non-volatile memory on the dealer card or security module (CKH).
8. Still further code in the dealer payment application program produces a payment instruction (ZA). The payment instruction (ZA) contains at least the following information:
   a) Identification data entered by the dealer or from the dealer card or dealer security module CKH).
   b) Identification data entered by the customer or from the customer chipcard (CKK).
   c) Payment amount in a particular currency.
   d) Payment method.
   e) Fingerprint of voucher or parts of fingerprint.
Optionally the payment instruction can be extended to include the date of payment or other parameters.
9. Computer code then inserts a serial number in the payment instruction by means of the dealer card (CKH) where a function is implemented on the dealer card (CKH) which generates serial numbers.
10. Sign the payment instruction completed in step 9 by the dealer card (CKH). The signature preferably is created by a symmetrical process using a secret key applied by the bank to the dealer card (CKH). Alternatively a signature using an asymmetric process using a private key may be employed.
11. Send the dealer-signed payment instruction to the applet in the customer terminal (DVK).
12. In the case of an on-line payment, the customer is now required to enter a PIN number or password.
The customer card (CKK) allows the next step only if the correct PIN number or correct password has been entered.
13. Reduce the amount of money recorded in the availability frame on the customer card (CKK) by the amount to be paid.
14. Sign the payment instruction using the customer card (CKK) with a symmetrical process. Alternatively an asymmetric process as in process step 10 can be employed. Optionally before signature by the customer card, a sequential customer serial number can be inserted.
15. Return the now dealer-signed and customer-signed payment instruction to the dealer payment application.
16. Store the signed payment instruction created at step 14 and the signed voucher created at step 7 in a non-volatile memory of the dealer terminal (DVH) for later transfer to the bank. Process steps 1–16 can be carried out by the dealer with various customers before process step 17 is performed.
17. Create an on-line connection to the bank and transfer data created at step 16 to the bank terminal (DVB) where the bank payment application performs the following process steps:
   a) Check the digital dealer signature and customer signature of payment instruction (ZA) for authenticity. In a symmetrical process, the bank has a secret key. In an asymmetric process, the bank has the public key. Optionally the bank checks the authenticity of the voucher.
   b) Check the relationship between payment instruction and voucher by the checking the fingerprint in the payment instruction by the bank payment application.
   c) Replace the customer identification data with the customer's account number and bank sort code or a credit card number or comparable information necessary to process the payment to the dealer. Replace the dealer identification data by the account number and bank sort code.

d) Perform payment transactions according to the payment instruction.

e) Optionally the customer may be informed that payment has been made.

Each of the above described steps is carried out by computer program instructions coded to read information from portable media, accept information from a customer or dealer, and process such information in computer process steps as described above.

Figure 9:
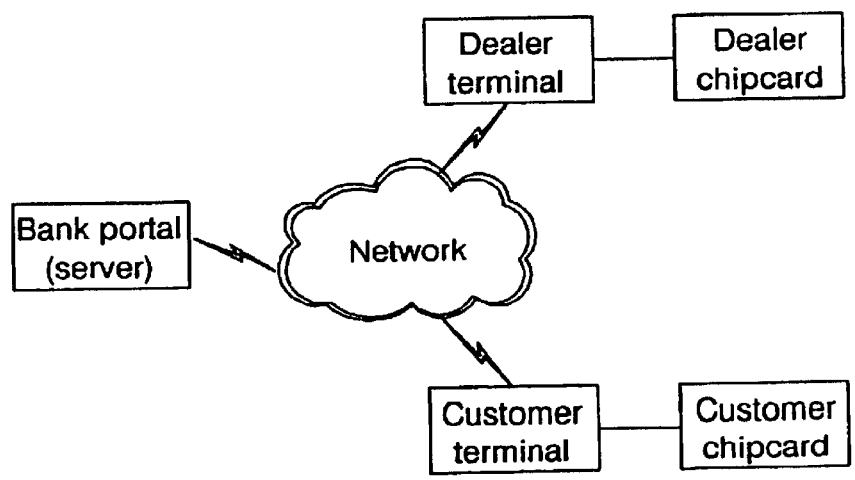
FIG. 9 shows the computer program product architecture according to the invention on which the process in FIG. 8 is based.

FIG. 9 shows the main components of the present invention. The main components are:

Customer card (chipcard);
Dealer card (chipcard or security module);
Bank server;
Dealer terminal;
Customer terminal;
Network (Internet);

Customer Card

The customer card or equivalent portable secure media, prepared according to the invention is issued by the bank as an anonymous card similar to a telephone card. The card is identified by a unique card number. The card can be installed as a conventional customer card or SIM module in a mobile telephone or as an integral security module in a PC, pocket computer or other consumer machine. On issue, functions such as credit card or electronic purse can be activated. When a customer is applying to a bank for additional functions for the multi-functional payment card, the customer specifies the payment methods he requires, his bank details with bank sort code and account number and where applicable his credit card number with expiration date. Also the customer can establish absolute maximum amounts or a total after on-line authorisation for the card and/or for the various payment methods by the bank. These maximum values, known as the availability frame, are reduced accordingly after payment and re-incremented in an ON-LINE transaction insofar as the portal bank classes the customer as creditworthy. The customer can also determine which payment methods shall also be protected by input of a personal identification number (PIN) where this is not already required for certain payment methods. The data can be given via a form or on-line at the kiosk or PC in the network. In particular a card intended for the payment method according to the invention can be used to identify the customer. The extra functions can also be requested before issue and installed and/or authorized on the card before issue of the card. Activation of applications on the card takes place during the first on-line transaction with the customer card at the bank server.

The customer profile which defines all extended payment functions is safely stored on the bank server. References to the required payment methods and the basic values of the availability frame are encrypted with a key known only to the bank, sent to the customer card and stored there.

An important advantage of the process of the invention lies in the fact that no sensitive customer data such as account number, credit card number etc. are stored on the customer card and hence misuse by unauthorised persons is substantially reduced. This reduced risk contrasts to prior art where credit card numbers are freely accessible and protected only by a PIN which is not a very secure form of protection.

The steps described above and hereinafter define the payment methods selected by the customer for processing and minimise the risk to the customer upon loss of the card. A customer can for example limit payments without PIN input to e.g. DM 50 and payments with PIN to DM 500 in total after the last on-line transaction. Reduction of the customer's risk also reduces the bank's risk.

This computer program method of the invention allows customers who do not have a bank account, such as children for example, to have an electronic payment means with restricted availability frame.

The customer card also contains a secret signature key (symmetrical DES or asymmetric RSA) with which vouchers can be signed.

The customer card can be implemented as a card with contacts or a contactless card. A consumer may have several cards, e.g. cash cards with availability frame nil and several cards for particular applications.

Dealer Card

The dealer card is issued by the bank. It can be issued in the same way as the customer card as a pre-structured card and activated subsequently. The dealer card stores the dealer identification, an account number or numbers to which the receipts are allocated, internal identification features e.g. vendor ID etc. The dealer card also contains all of the keys and cryptographic functions necessary for access to the customer card.

One function for example decodes the customer profile and the associated availability frame stored encrypted on the customer card.

In the dealer card is a secret key (asymmetric RSA) which has been certified by the bank or another reliable body. Offers to the customer and vouchers are signed using this key.

Bank Server

The bank server acts as a portal to all financial services. It processes the payment vouchers received by the dealer and from these generates conventional payment instructions (debit note, transfer, credit card etc.) and electronic vouchers which are stored for example in XML format on the server. One important advantage of the process of the invention is that existing systems for payment transactions need not be modified. Access to the vouchers takes place for example via the Internet. Access is limited to the customer. This can for example take place by means of authentication performed with the customer or dealer card (challenge/response process).

Dealer Terminal

The dealer terminal is preferably a PC cash till to which is connected either a Smartcard or chipcard reader with two read stations (slots) or two Smartcard or chipcard readers. The reader for the customer can also be connected specifically by wireless transfer (e.g. infrared, bluetooth etc). The customer card reader may also be in the possession of the customer (mobile telephone, pocket computer etc.). The dealer card is usually permanently active in operation. The customer card is required only for the payment process. Readers for customers can also be equipped with keypads for PIN input and extra display. The process does not however in principle require readers with special security functions (such as for example money cards). Security is achieved solely by secured interaction between customer card and dealer card.

The dealer terminal can also be implemented in one of the conventional card readers with programmable functions.

The dealer terminal can also be implemented as a client/server system. The reader for the dealer card is connected to the server and the reader for the customer card to the client of the customer PC, mobile telephone, pocket computer etc.

All machines have a network connection with which they can have access to the bank server. This connection is specifically required only for data exchange between dealer, customer and bank server. During the actual payment process there is no need for a connection via the network.

Customer Terminal

The customer terminal is either a PC, a pocket computer (organiser), a mobile telephone or other consumer machine, each with a chipcard reader such as a Smartcard reader. All machines have a network connection with which they can gain access to the bank server.

Network

All components have temporary access to a network. Preferably the network is an Internet or Intranet. The process requires no particular network security functions for operation of the system components. It is recommended that the dealer card or customer card also be used to obtain access to the bank portal server.

FIG. 3 shows the minimum content of the payment instruction as generated in the computer program process according to the invention. Here the payment instruction contains the following information:

identification of dealer, dealer card or security module identification of customer or customer card payment amount (optionally with currency)

payment method (credit note, debit note, credit etc.)

fingerprint of voucher.

The following information is optional:

serial number of customer card date of payment instruction proposed application further information.

Subsequently the following information can be added to the payment instruction:

signature of dealer signature of customer.

FIG. 4 shows the minimum content of the voucher as generated in the process according to the invention.

The voucher is used to describe the relevant transaction process between the customer and dealer. It serves as evidence for the content of the transaction performed. Preferably the voucher contains some or all of the following information:

a) names or item numbers of the products purchased b) unit price of products c) quantity of products d) total price e) value added and/or sales tax f) delivery costs g) payment amount (optional with currency)

h) identification of customer (e.g. card or customer number)

i) proposed application j) further information to describe the transaction performed.

Subsequently the following information can be added to the voucher:

dealer signature.

The voucher is preferably generated in a form in which it can be legibly shown via a user interface.

Figure 5:
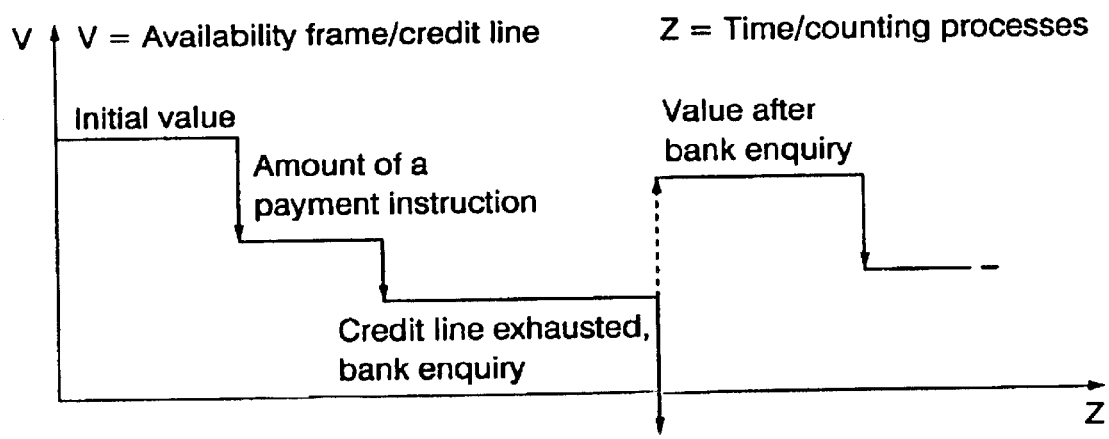
FIG. 5 shows an implementation of an availability frame (line of credit) according to the invention.

FIG. 5 shows an implementation of the availability frame/credit line using the example procedure.

The availability frame granted by the bank (amount limit) is stored as an amount in the non-volatile memory on the customer card. In an example of customer transactions 1 and 2, the customer makes payments 1 and 2 causing a reduction of the availability frame by amounts b1 and b2. A payment 3 may lead to the availability frame being exceeded. The dealer payment application then automatically creates an on-line connection to the bank to check whether the customer has been granted a new availability frame. If the customer is granted a new availability frame by the bank, the dealer payment application initiates a storage of the availability frame on the customer card in the non-volatile memory. Alternatively the connection to the bank can be initiated by the customer payment application.

Preferably the existing availability frame is checked by the dealer payment application on readout of customer data from the customer card. If the existing availability frame does not cover the payment, and the bank does not raise the availability frame to a new amount, the dealer receives from the dealer payment application a message that the payment can be accepted at his own risk.

FIG. 6 shows an embodiment of the customer card content in accord with the present invention.

The customer card must contain at least the following information:

identification data of customer or customer card secret key for signing the payment instruction (known only to the bank)

PIN number or password (known only to the customer)

payment methods which the bank permits availability frame.

The following information is optional:

sequential number for payment instructions;

proposed application (for insertion in voucher);

log of last n signed payment instructions; and secret key for access to card data (known only to the bank but available on the dealer card or security module).

The above described information is stored in the non-volatile memory of the customer card and is read by the dealer payment application and included in the payment instruction.

FIG. 7 shows the dealer card content or content of the security module of the dealer in accord with the present invention. The dealer security module contains at least the following information:

identification data of dealer or dealer security module;

secret key for signing the payment instruction (known only to the bank);

payment methods agreed with the bank; and serial number for payment instruction.

The following information is optional:

private key for signing the vouchers (known only to the dealer; corresponding public key stored with the bank);

secret key for access to customer card data;

running total of payment instructions signed; and log of last n signed payment instructions.

Having described the invention in terms of the preferred computer program product embodiment and set out various example forms of information employed in the computer method of the invention, it will be understood that other forms of information may be utilized in the various steps of the method, and other means for implementing portable media for carrying such information will suggest themselves without departing from the invention which is measured by the following claims.

What is claimed is:

1. Method for performing a cashless payment in a transaction using portable media comprising the steps of;

reading customer identification data, available amount and a plurality of payment methods permitted by a bank for a customer, from a customer portable media;

reading dealer identification data and payment methods acceptable to a dealer from a dealer portable media;

receiving a payment method choice input entered by the customer;

selecting the payment method chosen by the customer when the selected payment method is permitted by the customer portable media and accepted by the dealer portable media;

selecting on a priority basis, a payment method that is permitted and accepted, when the customer does not enter a choice and when the customer choice is not both permitted and accepted;

comparing a payment amount for a value less than the available amount;

going to the generating a voucher step of this method when the compare step returns a positive comparison;

automatically connecting in the same transaction, the customer portable media to the bank when the compare step did not return a positive comparison;

verifying at the bank, the available amount that the customer has available, when the compare step did not return a positive comparison;

raising the available amount recorded on the customer portable media to an amount not exceeding the amount that the customer has available, when the compare step did not return a positive comparison;

repeating the compare step and providing a message to the dealer when the compare step continues to not return a positive comparison;

generating a voucher having information of the transaction when the compare step returns a positive comparison;

generating a hash of the voucher;

generating a signature of the hash of the voucher;

generating a payment instruction comprising the steps of:
  adding the dealer identification information to the payment instruction,
  adding the customer identification information to the payment instruction,
  adding the payment method selected to the payment instruction, and adding the
  signature of the hash of the voucher to the payment instruction;

generating a dealer signature of the payment instruction;

reducing the available amount recorded on then customer portable media, by the payment amount;

generating a customer signature of the payment instruction;

performing the cashless payment by executing the payment instruction at the bank.

2. Computer program product for performing a cashless payment in a transaction using portable media comprising:

computer readable program code for reading customer identification data, available amount and a plurality of payment methods permitted by a bank for a customer, from a customer portable media;

computer readable program code for reading dealer identification data and payment methods acceptable to a dealer from a dealer portable media;

computer readable program code for receiving a payment method choice input entered by the customer;

computer readable program code for selecting the payment method chosen by the customer when the selected payment method is permitted by the customer portable media and accepted by the dealer portable media;

computer readable program code for selecting on a priority basis, a payment method that is permitted and accepted, when the customer does not enter a choice and when the customer choice is not both permitted and accepted;

computer readable program code for comparing a payment amount for a value less than the available amount;

computer readable program code for going to the generating a voucher step of this computer method when the compare step returns a positive comparison;

computer readable program code for automatically connecting in the same transaction, the customer portable media to the bank when the compare step did not return a positive comparison;

computer readable program code for verifying at the bank, the available amount that the customer has available, when the compare step did not return a positive comparison;

computer readable program code for raising the available amount recorded on the customer portable media to an amount not exceeding the amount that the customer has available, when the compare step did not return a positive comparison;

computer readable program code for repeating the compare step and providing a message to the dealer when the compare step continues to not return a positive comparison;

computer readable program code for program code for generating a voucher having information of the transaction when the compare step returns a positive comparison;

computer readable program code for generating a hash of the voucher;

computer readable program code for generating a signature of the hash of the voucher;

computer readable program code for generating a payment instruction comprising the steps of:
  adding the dealer identification information to the payment instruction,
  adding the customer identification information to the payment instruction,
  adding the payment method selected to the payment instruction, and adding the
  signature of the hash of the voucher to the payment instruction;

computer readable program code for generating a dealer signature of the payment instruction;

computer readable program code for reducing the available amount recorded on the customer portable media, by the payment amount;

computer readable program code for generating a customer signature of the payment instruction;

computer readable program code for performing the cashless payment by executing the payment instruction at the bank.

* * * * *